United States Patent
Malhotra et al.

(10) Patent No.: US 11,056,077 B2
(45) Date of Patent: Jul. 6, 2021

(54) APPROACH FOR AUTOMATICALLY ADJUSTING DISPLAY SCREEN SETTING BASED ON MACHINE LEARNING

(71) Applicant: International Business Machines Corporation, Armonk, NY (US)

(72) Inventors: Nikhil Malhotra, Bangalore (IN); Chandresh Kumar Maurya, Distt-Bhadohi (IN); Anupama Ray, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/682,405

(22) Filed: Nov. 13, 2019

(65) Prior Publication Data
US 2021/0142765 A1 May 13, 2021

(51) Int. Cl.
*G09G 5/10* (2006.01)
*G06F 3/01* (2006.01)
*G09G 5/30* (2006.01)

(52) U.S. Cl.
CPC .............. *G09G 5/10* (2013.01); *G06F 3/013* (2013.01); *G09G 5/30* (2013.01); *G09G 2320/0626* (2013.01); *G09G 2320/0666* (2013.01); *G09G 2340/0407* (2013.01); *G09G 2360/144* (2013.01)

(58) Field of Classification Search
CPC ............. G09G 5/10; G09G 2320/0626; G09G 2360/144; G09G 5/30; G06F 3/013
USPC ........................................ 345/690, 698, 699
See application file for complete search history.

(56) References Cited

U.S. PATENT DOCUMENTS

| 6,523,954 | B1 | 2/2003 | Kennedy |
| 10,201,273 | B2 | 2/2019 | Choukroun |
| 2008/0130958 | A1 | 6/2008 | Ziomek |
| 2008/0189173 | A1 | 8/2008 | Bakar |
| 2013/0235073 | A1* | 9/2013 | Jaramillo ................ G09G 5/00 345/619 |

(Continued)

FOREIGN PATENT DOCUMENTS

| CN | 101346755 A | 1/2009 |
| WO | 2014089870 A1 | 6/2014 |

OTHER PUBLICATIONS

Wikipedia: "Deep Learning", Wikipedia, printed Apr. 27, 2016, 40 pages. URL: https://en.wikipedia.org/wiki/Deep_learning#Deep_neural_networks. (Year: 2016).*

(Continued)

*Primary Examiner* — Jimmy H Nguyen
(74) *Attorney, Agent, or Firm* — Monchai Chuaychoo (57) ABSTRACT

The approach for automatically adjusting display setting for a user that uses corrective lens or not is disclosed. The approach determines whether a user is wearing corrective visual lens. If the user is not wearing correct visual lens, then the system measures the ocular features of the user via sensors. The system then transmits data associated with the ocular features to a deep learning server wherein the deep learning server analyzes the data. The server generates a customized display setting based on the analyzed data. The system receives the display setting from the deep learning server and automatically adjusts the display setting on a device of the user based on the received display setting.

20 Claims, 4 Drawing Sheets

(56) References Cited

U.S. PATENT DOCUMENTS

| | | | | |
|---|---|---|---|---|
| 2014/0137054 A1* | 5/2014 | Gandhi | ................ | G06F 3/0484 |
| | | | | 715/865 |
| 2014/0240338 A1* | 8/2014 | Patino | .................... | G06F 3/012 |
| | | | | 345/589 |
| 2017/0092007 A1 | 3/2017 | Goldberg | | |
| 2018/0247610 A1* | 8/2018 | Carey | ................ | G06K 9/00255 |
| 2018/0373058 A1* | 12/2018 | Bostick | .................... | G02C 7/04 |
| 2020/0184199 A1* | 6/2020 | Croxford | ............. | G06K 9/6256 |

OTHER PUBLICATIONS

"Multi-task learning", Wikipedia, This page was last edited on Mar. 31, 2019, at 11:25 (UTC), 11 pages.

"Personal Vision Tracker", EyeQue, Vision Test From Home, downloaded on Jul. 22, 2019, 7 pages, <https://www.eyeque.com/pvt/?gclid=EAIaIQobChMImf2g5ZrJ4wIVCJ>.

Bang et al., "Assessment of Eye Fatigue Caused by 3D Displays Based on Multimodal Measurements", Sensors (Basel), Sep. 2014: 14(9): 16467-16485, Published online Sep. 4, 2014. doi: 10.3390/s140916467, Revised Aug. 21, 2014; Accepted Sep. 2, 2014, Copyright © 2014 by the authors; licensee MDPI, Basel, Switzerland.

Ruder, S., "An Overview of Multi-Task Learning in Deep Neural Networks?", arXiv:1706.05098v1 [cs.LG] Jun. 15, 2017, 14 pages.

* cited by examiner

APPROACH FOR AUTOMATICALLY ADJUSTING DISPLAY SCREEN SETTING BASED ON MACHINE LEARNING

BACKGROUND

The present invention relates generally to electronic devices, and more particularly to automatically adjusting screen display on a mobile electronic device.

One of most prominent and distinctive feature of mobile computing devices (e.g., laptops, smartphones, etc.) is the screen. The screen fills most or nearly all the space on a device's front surface. Screen sizes are measured in diagonal inches. Screen are typically made from LCD (liquid crystal display) material. For examples, some of LCD types includes IPS (in-plane switching), LED (light-emitting diode), OLED (organic light-emitting diode), and AMOLED (active matrix organic light-emitting diode) displays. The aforementioned types can vary from one another based on resolution, brightness, contrast and longevity.

Depending on the operating environment, the display brightness can be adjusted on the handheld screen and/or settings on the keypad. For example, in an outdoor or bright (sunlight) environments, LCD backlight must be very bright in order to achieve readability, and the keypad backlight must be turned off to save power. In normal indoor or office conditions, the user can operate the handheld screen at a medium brightness while the keypad backlight is switched off. In a dim or dark condition, the LCD backlight should be at low intensity to prevent visual fatigue, and the keypad backlight should be turned on.

SUMMARY

Embodiments of the present invention disclose a computer-implemented method, computer program product and a computer system for automatically adjusting a display setting. The computer-implemented method, comprising: determining whether a user is wearing corrective visual lens; in responsive to the user is not wearing correct visual lens, measuring ocular features of the user via sensors; transmitting data associated with the ocular features to a deep learning server wherein the deep learning server analyzes the data and generating a first display setting based on the analyzed data; receiving the first display setting from the deep learning server; and adjusting the first display setting on a device of the user based on the received display setting.

The computer program product may include one or more computer readable storage media and program instructions stored on the one or more computer readable storage media, the program instructions comprising: program instructions to receive data from one or more sensors from an area; program instructions to determine whether a user is wearing corrective visual lens; in responsive to the user is not wearing correct visual lens, program instructions to measure ocular features of the user via sensors; program instructions to transmit data associated with the ocular features to a deep learning server wherein the deep learning server analyzes the data and program instructions to generate a first display setting based on the analyzed data; program instructions to receive the first display setting from the deep learning server; and program instructions to adjust the first display setting on a device of the user based on the received display setting.

The computer system may include one or more computer processors; one or more computer readable storage media; program instructions stored on the one or more computer readable storage media for execution by at least one of the one or more computer processors, the program instructions comprising: program instructions to receive data from one or more sensors from an area; program instructions to determine whether a user is wearing corrective visual lens; in responsive to the user is not wearing correct visual lens, program instructions to measure ocular features of the user via sensors; program instructions to transmit data associated with the ocular features to a deep learning server wherein the deep learning server analyzes the data and program instructions to generate a first display setting based on the analyzed data; program instructions to receive the first display setting from the deep learning server; and program instructions to adjust the first display setting on a device of the user based on the received display setting.

DETAILED DESCRIPTION

Embodiments of the present invention provide an efficient and intelligent approach to automatically adjust the display brightness on a device (e.g., mobile phone, laptops, wearable watches, etc.) based on the ocular feature (e.g., blink rate, distance between the eye of the user and the device, ambient lighting, etc.) of the user and lighting in the environment to help reduce eye strain and fatigue of the user. For example, one or more sensors (e.g., cameras, etc.) on a mobile device can capture images of the blink rate of the user and distance of the user from the device. The results of the image analysis can be used by an AI (Artificial Intelligence) system to dynamically adjust the display setting (e.g., brightness level, screen resolution, screen mode and display color temperature, etc.) for the user. For example, User A, does not wear glasses, is using his mobile phone to watch movies at the train station. His eyes have become fatigued/strained (e.g., increased blink rate and decreased distance between his eye and the device) due to the dim lighting condition at the train station. Embodiments can dynamically and continuously adjust the display brightness and color temperature based on i) the increased blink rate; ii) decreased eye distance from the device; and iii) low ambient lighting. Therefore, the eyes of the user are less strained after the adjustment of the display setting of his phone. The advantage of the embodiment is in how the AI system extract each of those ocular features, the construct/setup of the AI system during training (including network architecture) so that the AI system can perform for all users.

In one embodiment, effects from ocular disorders and CVS (computer vision syndrome) can be alleviated by automatically adjusting intensity/brightness of the device display according to the user's ocular features along with current lighting condition at the user's location. In another embodiment, predicting the onset of ocular disorder due to the observed pattern of blink rate for that user can be accomplished. For example, an increased blink rate may indicate fatigue which may lead to further degeneration of visual acuity if not corrected.

Some embodiments can adjust the screen display setting (e.g. brightness level, screen resolution, screen mode and color temperature, etc.) of the display device of a user that wears corrective lenses (e.g., prescription glasses, contact lenses, etc.). For example, User B wear glasses and is at her desk working on a technical document. Her office is at the corner of a 20-story building with two large windows. The sun light, through the windows, during the summer months tends to vary (i.e., light vs dark) due to the clouds that form spontaneously because of a nearby lake. Typically, her eyes become strained after 2 hours of use. However, with an embodiment of the present invention, her eye strain can be alleviated by continuously measuring her ocular feature during her work period. Initially, the embodiment may ask User B to turn her face from one side to another so multiple images of her face can be taken (from various angles) to determine her corrective lens type. The embodiment can determine that her glasses are a concave type, allowing measurement of other ocular features (i.e., similar process to users who do not wear corrective lens) in order to ascertain her customized display setting.

Font size has a relevance to eye strain with exposure over a long period of time. The present embodiment of the invention does not automatically change the font size of the application. However, an alternative embodiment of the invention can automatically change the font size. If the brightness is optimal for that condition, then the strain can be significantly reduced. For example: a screen with very less font size, if the brightness is optimal that will enhance the readability as the characters will be better noticeable. While for some applications, the font size can be changed (via java, python IDEs, etc.), for some font size cannot be changed but screen can be zoomed (i.e., pdfs).

A detailed description of embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

Figure 1:
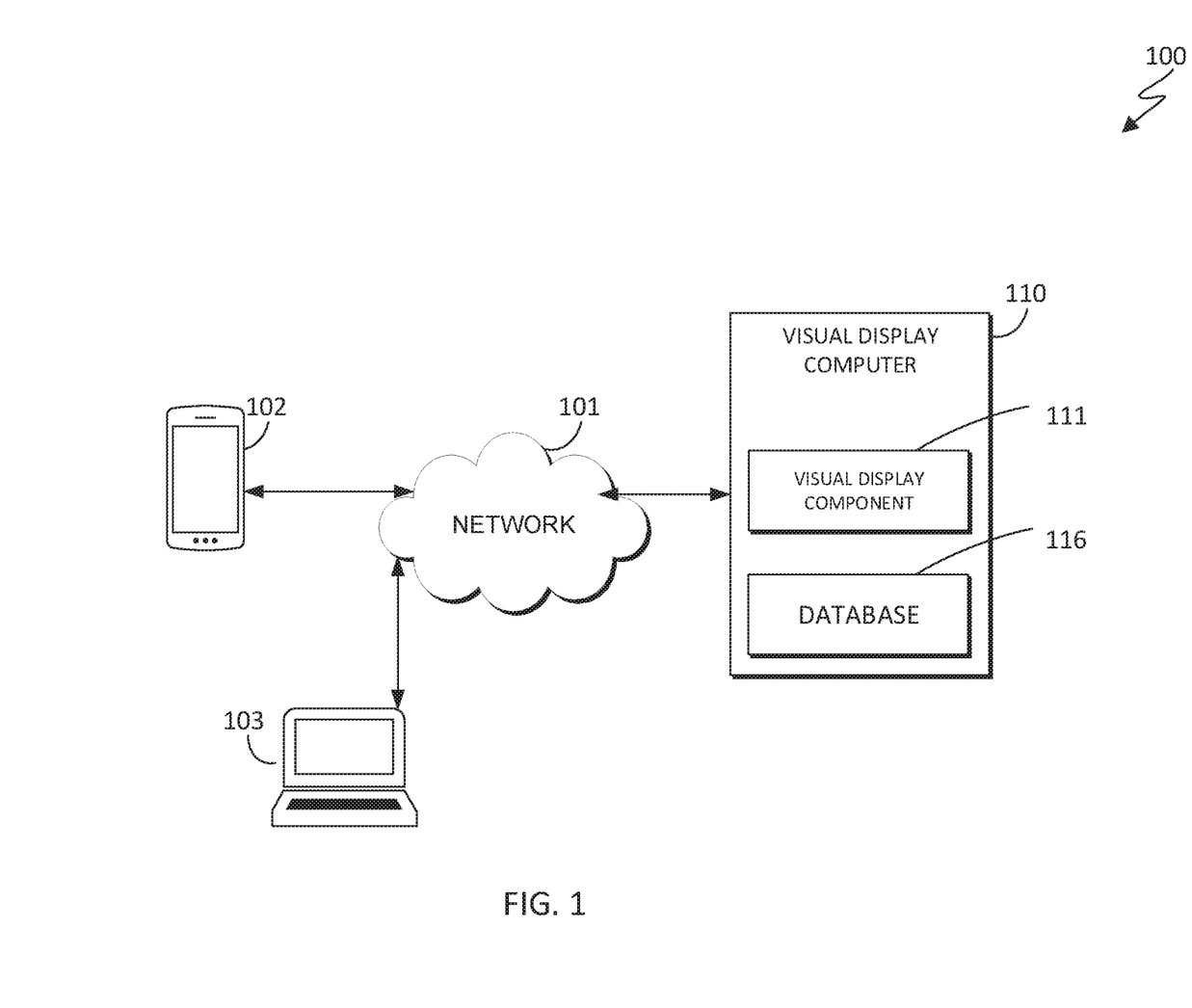
FIG. 1 is a functional block diagram illustrating a topology of a display auto-adjust detection environment, designated as 100, in accordance with an embodiment of the present invention.

FIG. 1 is a functional block diagram illustrating a topology of a display auto-adjust detection environment, designated as 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Display auto-adjust detection environment 100 includes mobile device 102, client computing devices 103 and visual display computer 110. All (e.g., 102, 103 and 110) elements can be interconnected over network 101.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between visual display computer 110 and other computing devices (not shown) within display auto-adjust detection environment 100.

Mobile device 102 represents a network capable mobile computing device that may receive and transmit data over a wireless network. Mobile computing device 102 can be a laptop computer, tablet computer, netbook computer, personal computer (PC), a personal digital assistant (PDA), a smart phone, smart watch (with GPS location) or any programmable electronic device capable of communicating with other computers (e.g., visual display computer 110) via network 101, in accordance with an embodiment of the present invention.

Client computing device 103 can be a laptop computer, a tablet computer, a smart phone, or any programmable electronic mobile device capable of communicating with various components and devices within display auto-adjust detection environment 100, via network 101. It is noted that client computing device 103 can also be a wearable computer. Wearable computers are miniature electronic devices that can be worn by the bearer under, with, or on top of clothing, as well as in or connected to glasses, hats, or other accessories. Wearable computers are especially useful for applications that require more complex computational support than merely hardware coded logics. In general, client computing device 103 represents any programmable electronic device or combination of programmable electronic devices capable of executing machine readable program instructions and communicating with other computing devices (not shown) within display auto-adjust environment 100 via a network, such as network 101. In the present embodiment, client computing device 103 can represent one or more computing devices. In another embodiment, client computing device 103 can include secondary computing devices (not shown) within display auto-adjust detection environment 100. The secondary computing devices (i.e., wearable computing device) can be used in conjunction with client computing device 103.

Visual display computer 110 can be a standalone computing device, a management server, a web server, a mobile computing device, or any other electronic device or computing system capable of receiving, sending, and processing data. In other embodiments, visual display computer 110 can represent a server computing system utilizing multiple computers as a server system, such as in a cloud computing environment. In another embodiment, visual display computer 110 can be a laptop computer, a tablet computer, a netbook computer, a personal computer (PC), a desktop computer, a personal digital assistant (PDA), a smart phone, or any other programmable electronic device capable of communicating other computing devices (not shown) within display auto-adjust detection environment 100 via network 101. In another embodiment, visual display computer 110 represents a computing system utilizing clustered computers and components (e.g., database server computers, application server computers, etc.) that act as a single pool of seamless resources when accessed within display auto-adjust detection environment 100.

Visual display computer 110 includes visual display component 111 and database 116.

Visual display component 111 enables the present invention to capture the ocular features of the users via sensors, analyze and automatically adjust the brightness level on a display based on the status of the user. Visual display component 111 will be described in greater details in regard to FIG. 2. It is noted that the described embodiments can run over a cloud or be integrated with the same (e.g., 102 or 103) electronic device offline (i.e., standalone application not requiring network access to a cognitive computer).

Database 116 is a repository for data used by visual display component 111. Database 116 can be implemented with any type of storage device capable of storing data and configuration files that can be accessed and utilized by visual display computer 110, such as a database server, a hard disk drive, or a flash memory. Database 116 uses one or more of a plurality of techniques known in the art to store a plurality of information. In the depicted embodiment, database 116 resides on visual display computer 110. In another embodiment, database 116 may reside elsewhere within display auto-adjust detection environment 100, provided that visual display component 111 has access to database 116. Optical display setting database (i.e., database 116) may contain information associated with, but is not limited to, corpus knowledge ocular disease, eye glass prescription and strength, various deep learning models for reducing eye strain/fatigue, and display settings for all mobile (e.g., make and model) and all portable computing devices (e.g., make and model).

Figure 2:
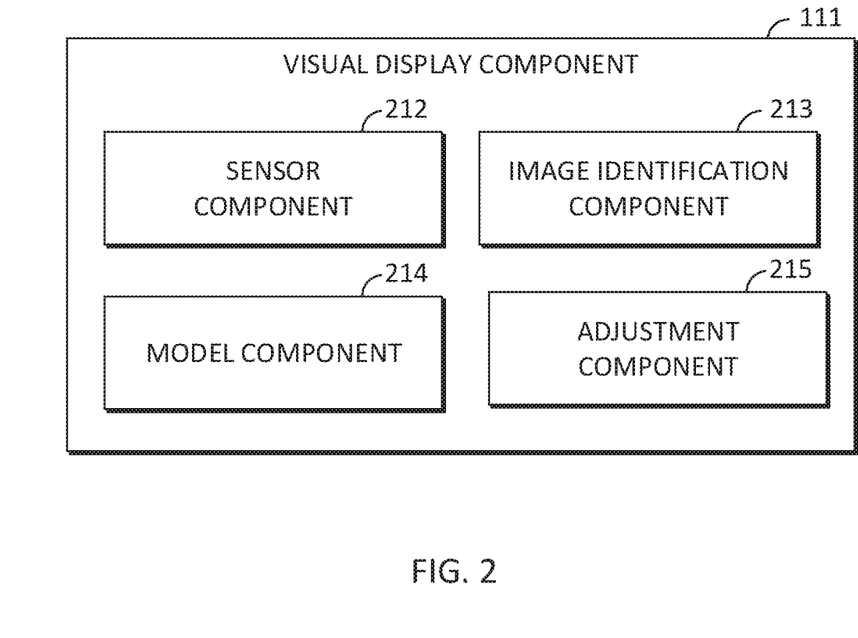
FIG. 2 is a functional block diagram illustrating visual display component in accordance with an embodiment of the present invention.

FIG. 2 is a functional block diagram illustrating visual display component 111 in accordance with an embodiment of the present invention. In the depicted embodiment, visual display component 111 includes sensor component 212, image identification component 213, model component 214 and adjustment component 215.

As is further described herein below, sensor component 212, of embodiments of the present invention provide the capability of communicating to various sensors (e.g., cameras, etc.) embedded in mobile devices 102 and client computing devices 103 located in the display auto-adjust detection environment 100. Additionally, sensor component 212 can access and retrieve data associated with the previously mentioned sensors. The sensor data can include, but it is not limited to, blink rate of the user, facial temperature, distance from the face of the user to the device, corrective lens of the user and ambient lighting level. Cameras on mobile/portable computing devices can measure distance using techniques known in the art (e.g., trigonometry, known dimensions, etc.). The distance can be computed from the camera input and the blink rate can also be deduced real-time from the camera input by maintaining a counter for the number of blinks made by the user in a minute. Detection of a sudden increase in the number of blinks along with the change in distance from the camera is the main trigger that indicates a need for a change in the brightness level of the display. Whether the change should be increased or decreased is also influenced by the ambient lighting conditions for all users and depends on the type of glasses worn but is unaffected for people who do not wear glasses.

It is noted, the user may be instructed to record multiple images of the corrective lens (on the face of the user) in order for the embodiments to recognize the corrective lens type (i.e. based on contour of the glasses). For example, continuing with User B, who is nearsighted and wear glasses, the system instructs User B to take several photos (from different angles) of her face.

As is further described herein below, image identification component 213, of embodiments of the present invention provides the capability of detecting and identifying objects in conjunction with sensor component 212. Sensor component 212 contains information related to various sensors. Using techniques known in the art of object identification based on video/graphics analysis (e.g., Mixture of Gaussian models, Wavelet decomposition, etc.), image identification component 213 can identify the following, but it is not limited to, blink rate of the user, facial temperature, distance from the face of the user to the device, ambient lighting level and various types of corrective lenses (e.g., bi-focal, convex, concave, cylindrical, contact lenses, etc.). For example, continuing with the example of User B, sensor component 212 instructs User B to record multiple images of her face while wearing her glasses. Image identification component 213 can identify that the glasses belonging to User B are a "concave" type lens to correct her eye condition. This information can be input in model component 214 for creating a customized deep learning for a user with corrective lenses. It is noted that other types of lenses (e.g., convex, cylindrical, bifocal, etc.) can be recognized/identified by the image identification component 213.

As is further described herein below, model component 214 of embodiments of the present invention provide the capability to create a deep learning model based on accumulating the collected data from sensor component 212 and image identification component 213. And based on deep learning model, model component 214 can generate an initial display setting for the user. Furthermore, based on the collected data, model component 214 can build a corpus of knowledge of possible types of ocular disorder, corrective lens type and power, typical blink rate of the user, etc. and model component 214 can build one or more deep learning models based on the corpus of knowledge. The created deep learning models can be customized for a specific user. For example, a deep learning model for User A (without corrective lenses) has been generated based on the ocular features of User A. The deep learning model can suggest/predict a customized display setting for User A. In another example, a deep learning model for User B (with corrective lenses) has been generated based on the ocular features of User B. The deep learning model can suggest/predict a customized display setting for User B. It is noted that model component 214 may obtain other data (e.g., daylight schedule, weather prediction, etc.) from database 116 in addition to data from sensor component 212 and image identification component 213 to build a deep learning model for the user. It is also noted that there can be several models generated and updated by the deep learning server. For example, as previously mentioned, there can be two models, one for general users with corrective lenses and one for general users without corrective lenses. Other models can include, but are not limited to, users with a specific ocular disease and users with color blindness.

In an embodiment, a neural network can be trained with a dataset that can be comprised of images of concave lens, convex lens, cylindrical lens, bifocal lens, and images without any glasses. These images are taken from all directions of a human face and have the information of types of glasses or no glasses along with the label associated with each image. A neural network trained on such a dataset can easily classify and detect the type of glass (e.g., concave, convex, cylindrical or bifocal) or no glass when being tested on users. This model can be trained once and loaded on a cloud network/server. However, the actual training time does not have an impact to the end user, but the inference time will be in real time as the network does not have a lot of classes to classify.

Furthermore, the AI system can be trained using data collected from varieties of users taking their visual pictures over different times and comparing with the ground truth data. Ground truth data can be easily collected by taking pictures of people's faces in different moods and extracting those features which distinguish the happy, tired or angry faces.

Training phase/period can occur during system setup and initialization. Training of the model can start once there are data from sensor inputs. The neural network can extract the right features from the sensor inputs that could discriminate between them to predict the optimal brightness level. Training phase is done on a very deep neural network with multiple layers, huge number of parameters and hyperparameters and using regularization. Thus, training period can be expensive, and it can run for a few days to properly converge in terms of accuracy on both training as well as validation dataset (i.e., used for testing the model while it is being trained). The model can be trained offline and deployed on cloud once done. Thus, even if it takes few days to train, there is no impact to the user during initialization and setup period of the embodiment.

Inference time means the time required by the model to process the new inputs and give a prediction of optimal brightness level based on all sensor inputs. This inference time is typically less than 1 second and can be considered real-time. Thus, the end user will not experience a lag and will not require have to manually change brightness level or stress the eye. Once the sensor inputs pass the model, the backend processing computes the features determining the eye problems, ambient light, distance computation, glass type predictions, blink rate, fatigue prediction. These features are used by the model to predict the optimal brightness level that is required as well as would be comfortable for the user to continue with given his/her personalized features.

The neural network training is not trivial as it requires (a) domain knowledge of optometry and neuroscience to come up with the right set of features that can decide the visual brightness level and comfortability based on several varying parameters (different users with different eye problems such as myopia, hypermetropia etc., ambience lighting levels and comfortability of user), (b) engineering expertise to extract the features from different sensor input, camera calibration understanding, (c) computer vision scientist for expertise in deep neural network training for such vision problems and d) several convolutional layers (i.e., layers are better for vision problems) followed by some Long short term memory (LSTM) layers since they are better for temporal sequences and the AI system is getting a time-variant signal from its sensors.

The reason for non-triviality in training the network: Building this architecture and training this neural network involves a lot of feature engineering as well as hyper-parameter optimization. The hyper-parameter optimization determines the scalability and accuracy of the overall system. The system should not overfit on the training data and thus needs multiple levels of regularization so that it works with similar level of accuracy on any random test sample. Thus, rigorous validation of the model is also done while training with different initialization of the network.

Additionally, for training the neural network, apart from the feature engineering, there is an interaction requirement from a human since a human (e.g., administrator, etc.) is needed to manually label the features with the right brightness level.

Regarding algorithm of the neural network training, it can be expressed mathematically below:

$$i_t = \sigma(W_{xi} * X_t + W_{hi} * H_{t-1} + W_{ci} \circ C_{t-1} + b_i)$$

$$f_t = \sigma(W_{xf} * X_t + W_{hf} * H_{t-1} + W_{cf} \circ C_{t-1} + b_f)$$

$$C_t = f_t \circ C_{t-1} + i_t \circ \tanh(W_{xc} * X_t + W_{hc} * H_{t-1} + b_c)$$

$$o_t = \sigma(W_{xo} * X_t + W_{ho} * H_{t-1} W_{co} \circ C_t \circ b_o)$$

$$H_t = o_t \circ \tanh(C_t)$$

['*' denotes the convolution operator and '∘', is the Schur product or entry wise product]

Nomenclature: The inputs $X_1, \ldots, X_t$, (extracted or computed features such as blink rate, type of glass, ambient light content, distance from camera to eye, current brightness level etc.); cell outputs $C_1, \ldots, C_t$, (computed by the network during training); hidden states $H_1, \ldots, H_t$, (learned feature output of each cell at every time instant), and gates it (output of input gate of each cell); $f_t$ (output of forget gate of each cell); and $o_t$ (output which is composed of outputs from input gate, forget gate, hidden state at previous timestep and cell state).

As is further described herein below, adjustment component 215 of the embodiment of the present invention provides the capability of dynamically adjusting, through AI (Artificial Intelligence), display settings of a display device customized and unique for each user. Based on the initial deep learning model created by model component 214 of the user, adjustment component 215 continuously monitors the ocular features of the user in order to fine tune the initial display setting suggested by the deep learning model. For example, the lighting in User B's office changes from bright to dim due to the degradation of the light bulb. After a period of time, adjustment component 215 can determine the display setting that the user finds acceptable based om reduced eye strain/fatigue. It is noted that users can override the automatic display setting and manually change the display setting.

Figure 3:
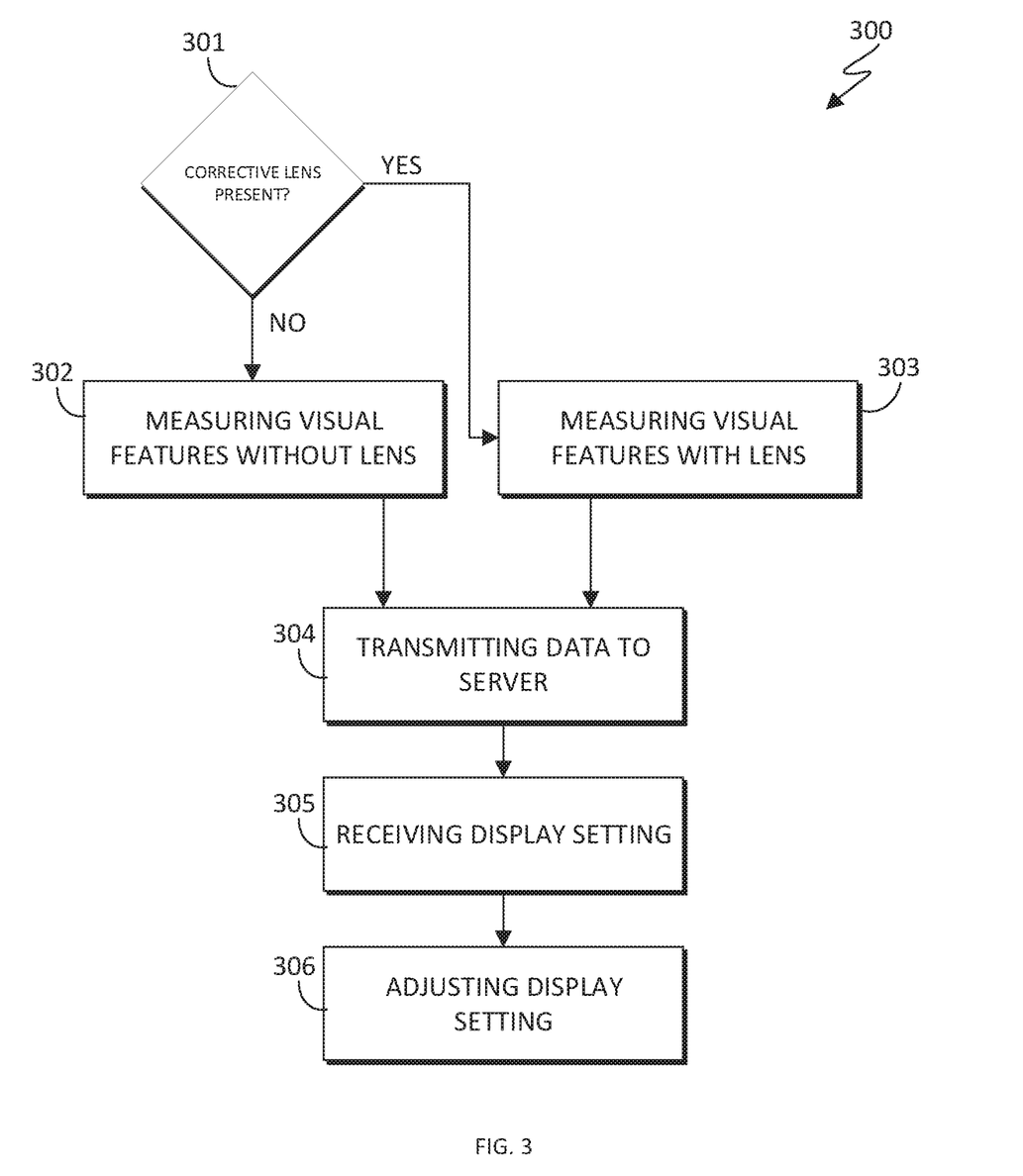
FIG. 3 is a flowchart illustrating the operation of a display auto-adjust system, designated as 300, in accordance with an embodiment of the present invention.

FIG. 3 is a flowchart, designated as 300, illustrating the operation of a display auto-adjust detection environment 100, in accordance with an embodiment of the present invention.

Visual display component 111 can determine whether the user is wearing corrective lenses (decision block 301). In an embodiment, visual display component 111 through sensor component 212 can detect the presence of corrective lenses on a user. If sensor component 212 detects a presence of a corrective lenses ("YES" branch, decision block 301) then visual display component 111 proceeds to measure ocular features of users with corrective lens (step 303). For example, referring to previously mentioned scenario with User B, visual display component 111 detects (via sensor component 212) that the User B is wearing glasses. If sensor component 111 does not detects a presence of a corrective lens ("NO" branch, decision block 301) then visual display component 111 proceeds to measure ocular features of users without corrective lens (step 302). For example, referring to previously mentioned scenario with User A, visual display does not detect glasses on User A.

Visual display component 111 measures ocular features of the users without corrective lens (step 302). In an embodiment, visual display component 111 through sensor component 212 measures the ocular features (e.g., blink rate, distance from the eyes to the screen, ambient light, etc.). For example, cameras on mobile device 102 can measure the distances of the eyes of the user from the screen. In another example, camera on client computing device 103 can measure the blink rate of the user while the user is observing the screen. In yet another example, a photon sensor on the camera can detect the intensity of the ambient light environment.

Visual display component 111 measures ocular features of the users with corrective lens (step 303). In an embodiment, visual display component 111, through sensor component 212, measures the ocular features of the users including determining the corrective lens type. After determining that the user is wearing corrective lens, visual display component 111, through sensor component, instructs the user to rotate their head from left to right for the camera to record multiple images from various angles. Based on the recorded images, image identification component 213 can determine the lens type (e.g., concave, convex, cylindrical, etc.) For example, visual display component 111 asks User B via a dialogue box on her laptop (e.g., client computing device 103) to turn her head from left to right in front of the camera on the laptop. After measuring the corrective lens visual display component 111 continues to record the remaining ocular features. For example, cameras on the laptop of User B can measure the distances of her eyes from the laptop screen. In another example, a camera on client computing device 103 can measure the blink rate of the user while the user is observing the screen.

Visual display component 111 transmits the data to the server (step 304). In an embodiment, visual display component 111 can transmit the data associated with the ocular features of the user to the deep learning server (i.e., visual display computer 110). After receiving the data, visual display computer 110 can build a new deep learning model about the user if a deep learning model associated with the user does not exist. In an alternative embodiment, visual display component 111 can update an existing deep learning model associated with the user if the model exists. After visual display computer 110 analyzes the data, visual display computer 110 determines an optimal display setting customized for the user. Visual display computer 110 can generate a display setting based on the analysis. For example, referring to User B, a deep learning model for User B with corrective lens has been generated and through model component 214, an initial display setting for User B has been created.

Visual display component 111 receives a display setting (step 305). In an embodiment, visual display component 111 receives a display setting from visual display computer 110. For example, after analyzing the data and generating a custom display setting for User B, visual display computer 110 sends the setting to visual display component 111.

Visual display component 111 adjusts the display setting (step 306). In an embodiment, visual display component 111 dynamically adjusts a display setting on mobile device 102 and/or client computing device 103. For example, visual display component 111 automatically and continuously adjusts the display brightness setting on the laptop of User B based on the changes in the environment (e.g., office lighting changes, etc.).

The present invention may be a system, a method, and/or a computer program product. The computer program product may include a computer readable storage medium (or media) having computer readable program instructions thereon for causing a processor to carry out aspects of the present invention.

Figure 4:
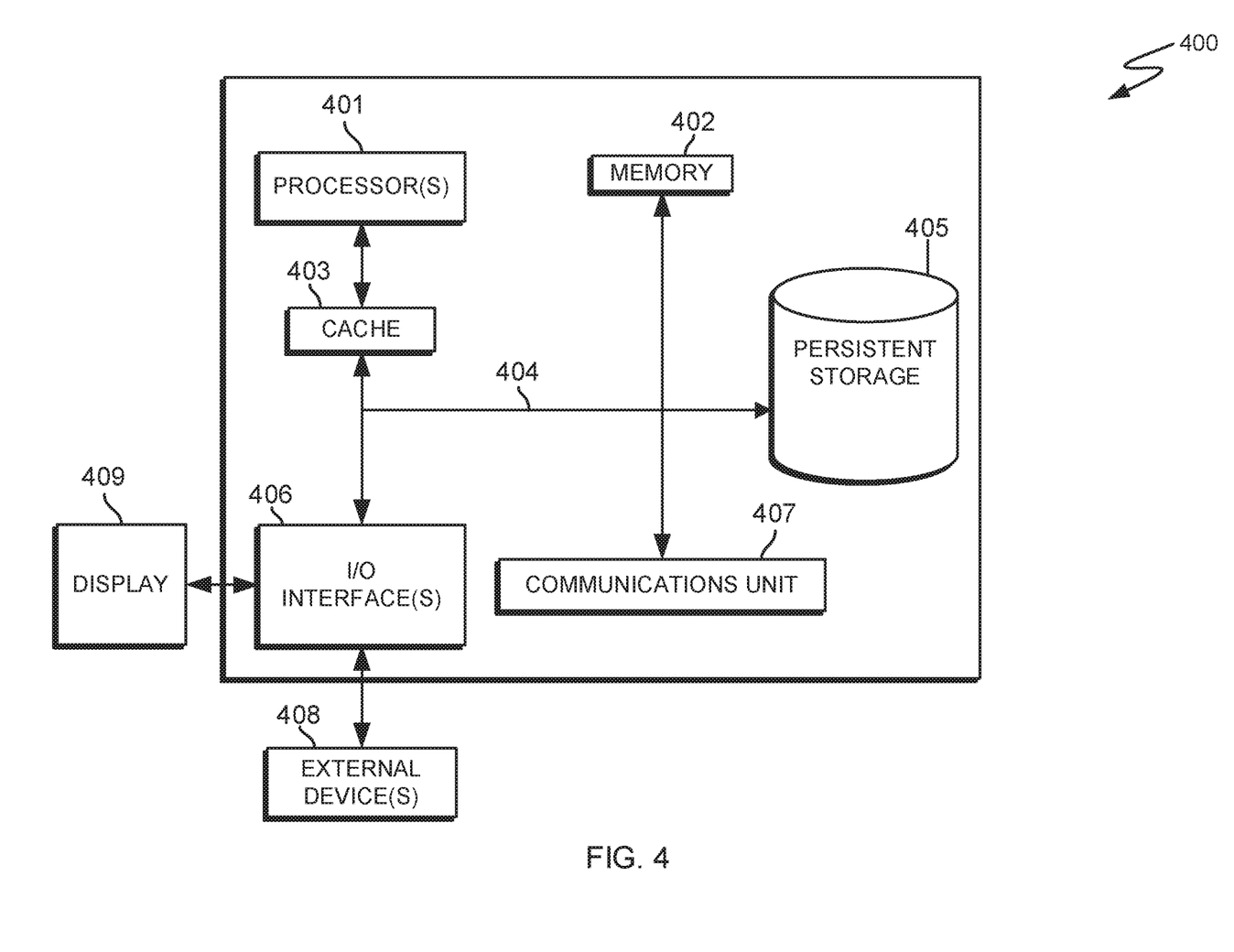
FIG. 4 depicts a block diagram, designated as 400, of components of a server computer capable of executing the visual display component system within the display auto-adjust detection environment, of FIG. 1, in accordance with an embodiment of the present invention.

FIG. 4 depicts a block diagram of components of visual display component 111 application, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., visual display component 111 and database 116) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Visual display component 111 can be stored in persistent storage 405 for access and/or execution by one or more of the respective processor(s) 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., visual display component 111) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., visual display component 111) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for automatically adjusting display setting on a device, the computer-implemented method comprising:
   determining if a user is wearing corrective visual lenses;
   responsive to the user not wearing the corrective visual lenses, measuring ocular features of the user via sensors, wherein the ocular features are selected from a group consisting of a blink rate of the user, facial temperature, and distance from the user to the device, and measuring other features selected from a group consisting of a daylight schedule, weather prediction and brightness level of background environment;
   transmitting data associated with the ocular features and other features to a deep learning server and wherein the transmitted data are used as inputs into the deep learning server;
   training the deep learning server with the inputs, wherein the training is based on factors comprising, domain knowledge of optometry and neuroscience, engineering expertise on extracting the other features and the ocular features from the sensors, computer vision scientist and several convolutional layers followed by LSTM (Long Short term memory) layers and wherein the training the deep learning server does not overfit data and includes multiple levels of regularization;
   analyzing, by the deep learning server, the data and generating an initial display setting;
   receiving the initial display setting from the deep learning server;
   setting a display setting on the device of the user based on the initial display setting;
   monitoring environmental changes and the ocular features that affects the user and generates a subsequent display setting; and
   adjusting the initial display setting on the device of the user based on the subsequent display setting.

2. The computer-implemented method of claim 1, wherein the deep learning server is trained based on a LSTM (Long Short term memory) algorithm.

3. The computer-implemented method of claim 1, wherein said adjusting the initial display setting, comprises brightness level, screen resolution, screen mode and display color temperature.

4. The computer-implemented method of claim 1, wherein the deep learning server analyzes the data, further comprises:
   determining whether a customized model exist for the user;
   responsive to determine that the customized model does not exist then creating, through deep learning, a customized model based on the ocular features;
   responsive to determine that the customized model does exist then updating through deep learning, the customized model of the user based on the ocular features; and
   determining, through deep learning, the initial display setting based on the customized model, ocular features, and optical display setting database.

5. The computer-implemented method of claim 4, wherein the deep learning server generates the initial display setting based on the analyzed data, further comprises:
   determining a model and make of the device of the user;
   determining available display setting of the device based on the make and model; and
   creating the initial display setting based on the available display setting of the device and the customized model.

6. The computer-implemented method of claim 4, wherein the optical display setting database comprises of, but is not limited to, corpus knowledge ocular disease, eyeglasses prescription and strength, various deep learning models for reducing eye strain/fatigue, and display settings for all mobile and portable computing devices.

7. The computer-implemented method of claim 1, further comprising:
   in responsive to the user is wearing corrective visual lens, measuring the corrective visual lens by recording multiple images of a contour associated with the corrective visual lens by the sensors;
   transmitting corrective lens data based on the multiple images to the deep learning server, wherein the deep learning server analyzes the ocular features along with the corrective lens data and generates a subsequent display setting;
   receiving the subsequent display setting from the deep learning server; and
   adjusting the subsequent display setting on the device of the user, wherein adjusting the subsequent display setting further comprises of brightness level, screen resolution, screen mode and display color temperature.

8. A computer program product for automatically adjusting display brightness, the computer program product comprising:
   one or more computer readable non-transitory storage media and program instructions stored on the one or more computer readable storage media, the program instructions, when executed by a processor, causing the processor:
to determine whether a user is wearing corrective visual lens;
in responsive to the user is not wearing correct visual lens, to measure ocular features of the user via sensors, wherein the ocular features are selected from a group consisting of a blink rate of the user, facial temperature, and distance from the user to a device, and to measure other features selected from a group consisting of a daylight schedule, weather prediction and brightness level of background environment;
to transmit data associated with the ocular features and other features to a deep learning server, and wherein the transmitted data are used as inputs into the deep learning server;
to train the deep learning server with the inputs, wherein the training is based on factors comprising, domain knowledge of optometry and neuroscience, engineering expertise on extracting the other features and the ocular features from the sensors, computer vision scientist and several convolutional layers followed by LSTM (Long Short term memory) layers and wherein the training the deep learning server does not overfit data and includes multiple levels of regularization;
to analyze, by the deep learning server, the data and to generate an initial display setting;
to receive the initial display setting from the deep learning server;
to set a display setting on the device of the user based on the initial display setting;
to monitor environmental changes and the ocular features that affects the user and to generate a subsequent display setting; and
to adjust the initial display setting on the device of the user based on the subsequent display setting.

9. The computer program product of claim 8, further comprising:
in responsive to the user is wearing corrective visual lens, program instructions, when executed by a processor, causing the processor/computer, to measure the corrective visual lens by recording multiple images of a contour associated with the corrective visual lens by the sensors;
program instructions, when executed by a processor, causing the processor/computer, to transmit corrective lens data based on the multiple images to the deep learning server, wherein the deep learning server analyzes the ocular features along with the corrective lens data and program instructions to generate a subsequent display setting;
program instructions, when executed by a processor, causing the processor/computer, to receive the subsequent display setting from the deep learning server; and
program instructions, when executed by a processor, causing the processor/computer, to adjust the subsequent display setting on the device of the user, wherein program instructions, when executed by a processor, causing the processor/computer, to adjust the subsequent display setting further comprises of brightness level, screen resolution, screen mode and display color temperature.

10. The computer program product of claim 8, wherein the deep learning server is trained based on a LSTM (Long Short term memory) algorithm.

11. The computer program product of claim 8, wherein said program instructions, when executed by a processor, causing the processor/computer, to adjust the initial display setting, comprises brightness level, screen resolution, screen mode and display color temperature.

12. The computer program product of claim 8, wherein the deep learning server analyzes the data, further comprising:
program instructions, when executed by a processor, causing the processor/computer, to determine whether a customized model exist for the user;
responsive to determine that the customized model does not exist then program instructions, when executed by a processor, causing the processor/computer, to create, through deep learning, a customized model based on the ocular features;
responsive to determine that the customized model does exist then program instructions when executed by a processor, causing the processor/computer, to update through deep learning, the customized model of the user based on the ocular features; and
program instructions, when executed by a processor, causing the processor/computer, to determine, through deep learning, the initial display setting based on the customized model, ocular features, and optical display setting database.

13. The computer program product of claim 12, wherein the deep learning server generates the initial display setting based on the analyzed data, further comprising:
program instructions, when executed by a processor, causing the processor/computer, to determine a model and make of the device of the user;
program instructions, when executed by a processor, causing the processor/computer, to determine available display setting of the device based on the make and model; and
program instructions, when executed by a processor, causing the processor/computer, to create the initial display setting based on the available display setting of the device and the customized model.

14. The computer program product of claim 12, wherein the optical display setting database comprises of, but is not limited to, corpus knowledge ocular disease, eyeglasses prescription and strength, various deep learning models for reducing eye strain/fatigue, and display settings for all mobile and portable computing devices.

15. A computer system for automatically adjusting display brightness, the computer system comprising:
one or more computer processors;
one or more computer readable non-transitory storage media; and
program instructions stored on the one or more computer readable storage media for execution by at least one of the one or more computer processors, the program instructions, when executed by the one or more computer processors, causing the one or more computer processors:
to determine whether a user is wearing corrective visual lens;
in responsive to the user is not wearing correct visual lens, to measure ocular features of the user via sensors, wherein the ocular features are selected from a group consisting of a blink rate of the user, facial temperature, and distance from the user to a device, and to measure other features selected from a group consisting of a daylight schedule, weather prediction and brightness level of background environment;

to transmit data associated with the ocular features and other features to a deep learning server, and wherein the transmitted data are used as inputs into the deep learning server;

to train the deep learning server with the inputs, wherein the training is based on factors comprising, domain knowledge of optometry and neuroscience, engineering expertise on extracting the other features and the ocular features from the sensors, computer vision scientist and several convolutional layers followed by LSTM (Long Short term memory) layers and wherein the training the deep learning server does not overfit data and includes multiple levels of regularization;

to analyze, by the deep learning server, the data and to generate an initial display setting;

to receive the initial display setting from the deep learning server; and to set a display setting on a device of the user based on the initial display setting;

to monitor environmental changes and the ocular features that affects the user and to generate a subsequent display setting; and to adjust the initial display setting on the device of the user based on the subsequent display setting.

16. The computer system of claim 15, the computer system comprising:

in responsive to the user is wearing corrective visual lens, to measure the corrective visual lens by recording multiple images of a contour associated with the corrective visual lens by the sensors;

to transmit corrective lens data based on the multiple images to the deep learning server, wherein the deep learning server analyzes the ocular features along with the corrective lens data and to generate a subsequent display setting;

to receive the subsequent display setting from the deep learning server; and to adjust the subsequent display setting on the device of the user, to adjust the subsequent display setting further comprises of brightness level, screen resolution, screen mode and display color temperature.

17. The computer system of claim 15, wherein the deep learning server is trained based on a LSTM (Long Short term memory) algorithm.

18. The computer system of claim 15, wherein the deep learning server analyzes the data, the computer system further comprising:

to determine whether a customized model exist for the user;

responsive to determine that the customized model does not exist, then to create, through deep learning, a customized model based on the ocular features;

responsive to determine that the customized model does exist, then to update through deep learning, the customized model of the user based on the ocular features; and to determine, through deep learning, the initial display setting based on the customized model, ocular features, and optical display setting database.

19. The computer system of claim 18, wherein the deep learning server generates the initial display setting based on the analyzed data, further comprising:

to determine a model and make of the device of the user;

to determine available display setting of the device based on the make and model; and to create the initial display setting based on the available display setting of the device and the customized model.

20. The computer system of claim 18, wherein the optical display setting database comprises of, but is not limited to, corpus knowledge ocular disease, eyeglasses prescription and strength, various deep learning models for reducing eye strain/fatigue, and display settings for all mobile and portable computing devices.

* * * * *